United States Patent

[11] 3,592,460

| [72] | Inventor | Willison L. Lower<br>Camden County, N.J. |
|---|---|---|
| [21] | Appl. No. | 780,506 |
| [22] | Filed | Dec. 2, 1968 |
| [45] | Patented | July 13, 1971 |
| [73] | Assignee | Duffield Machine Shop, Inc.<br>Gloucester City, N.J. |

[54] VISE FOR USE WITH MACHINE TOOLS
5 Claims, 3 Drawing Figs.

[52] U.S. Cl. ................................................. 269/101, 269/81
[51] Int. Cl. ................................................. B23q 3/04
[56] References Cited
UNITED STATES PATENTS
1,471,118 10/1923 Gething........................ 269/101

2,305,143 12/1942 Curtis........................ 269/245
2,889,757 6/1959 Cole........................... 269/95 x
3,051,473 8/1962 Juhase........................ 269/95

*Primary Examiner*—Andrew R. Juhasz
*Assistant Examiner*—Donald D. Evenson
*Attorney*—Seidel and Gonda ABSTRACT: A vice providing vertically oriented gripping surfaces, comprising a base member adapted to be placed at a corner of a supporting surface and having a slide portion and an anvil having a vertically oriented gripping face, and a jaw coupled to the slide portion and having a vertically oriented gripping face opposed to the gripping face of the base, the gripping faces being positioned to accommodate vertically elongated workpieces.

PATENTED JUL 13 1971 3,592,460
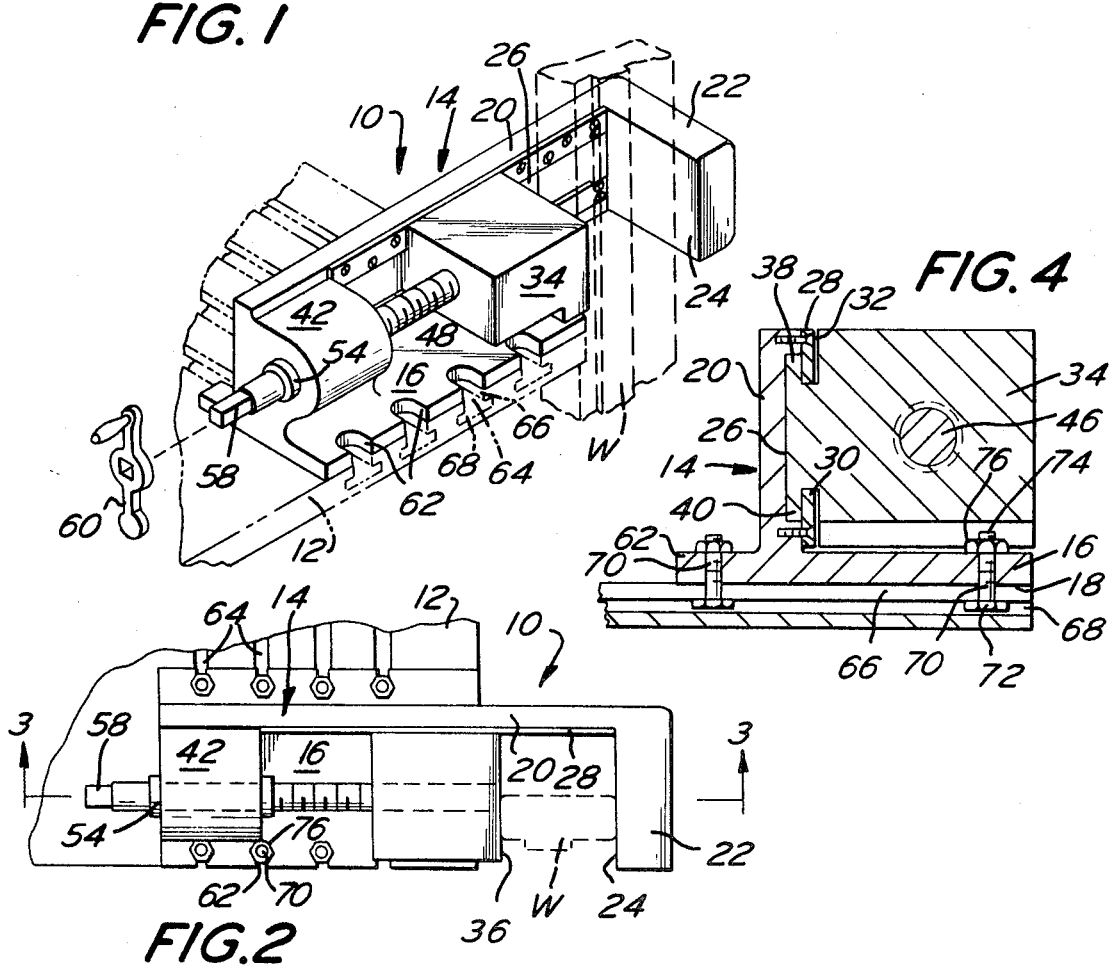
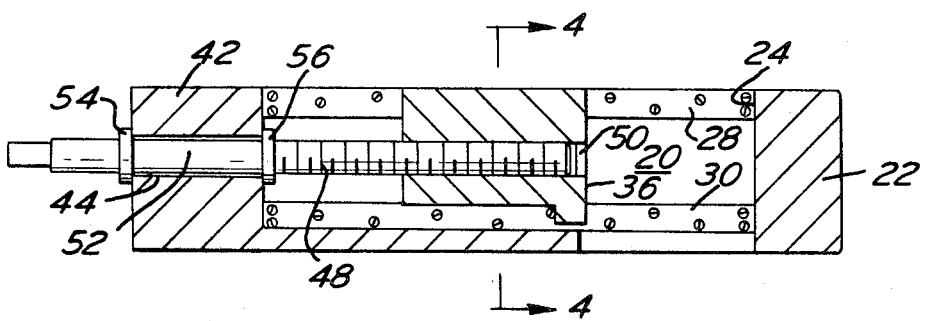
INVENTOR
WILLISON L. LOWER
BY
Seidel & Gonda
ATTORNEYS.

VISE FOR USE WITH MACHINE TOOLS

This invention relates to a vise for use with machine tools, and more particularly, to a vise particularly suited for holding vertically elongated workpieces for operations in milling machines, drill presses or the like.

Numerous vise constructions for use with machine tools have been proposed. For example, in milling machines, a workpiece-holding vise is frequently seen coupled to the horizontally extending worktable, with an upwardly facing base member overlying and coupled to a portion of the table. The base member provides support for a fixed, upwardly extending jaw, and a slidable jaw. In such an arrangement, the base member and worktable provide a limitation on the vertical height of the workpiece. Machining operations cannot be performed on the ends of large vertically elongated workpieces, since tools cannot be brought to bear on the ends of such workpieces.

Accordingly, it is an object of the present invention to provide a vise suitable for use with machine tools.

It is another object to provide a vise capable of securely holding vertically elongated workpieces for machining.

It is a still further object of this invention to provide a vise capable of securement to existing, conventional worktables.

Other objects will appear hereinafter.

The foregoing and other objects are accomplished in a preferred form of the invention by apparatus comprising a base member having a support face thereon, and a horizontally extending slide portion disposed generally at right angles to the support face. An anvil having a generally vertically disposed gripping face is coupled in such embodiment to the slide portion. Also, a jaw member is coupled to the slide portion, and includes a vertically disposed gripping face. Means are provided for selectively moving said jaw member longitudinally of said slide portion.

For the purpose of illustrating the invention, there is shown in the drawings a form which is presently preferred; it being understood, however, that this invention is not limited to the precise arrangements and instrumentalities shown.

FIG. 1 is a perspective view showing a vise in accordance with the present invention.

FIG. 2 is a top plan view.

FIG. 3 is a cross-sectional view, taken along the line 3-3 in FIG. 2.

FIG. 4 is a cross-sectional view taken along the line 4-4 in FIG. 3.

Referring now to the drawings in detail, wherein like numerals indicate like elements, there is shown in FIGS. 1, 2 and 4 a vise, designated generally by the reference numeral 10, coupled to a worktable 12. The worktable 12 may be a portion of a machine tool, such as a drill press, milling machine, or the like, or may simply be a fixed workbench.

The vise 10 includes a base member, designated generally by the reference numeral 14. The base member 14 includes a generally horizontally extending support flange 16. The lower face of the support flange 16 provides a support face for the base member 14.

Disposed on the base member 14 at generally right angles to the support flange 16 and support face 18 is a slide portion 20.

An anvil portion 22 is fixedly coupled to the base member 14. In the illustrated embodiment, the anvil portion 22 is disposed at a distal end of the slide portion 20. The anvil portion 22 includes a gripping face 24. As is apparent in FIGS. 1 to 3, the gripping face 24 is generally vertically disposed.

Referring now to FIG. 4, the slide portion 20 is seen to include a generally U-shaped trough 26. Tracks 28, 30, coupled to the slide portion 20 by machine screws 32, or the like extend inwardly over the side portions of the trough 26.

A jaw member 34 is slidably coupled to the slide portion 20. The jaw member 34 includes a gripping face 36 juxtaposed to the gripping face 24 on the anvil portion 22. The jaw member 34 also includes flanges 38 and 40 extending behind the tracks 28 and 30. Thus, the tracks 28 and 30 serve to retain the jaw member 34 in sliding engagement with the slide portion 20. Other means may be provided for retaining the jaw member 34. For example, the slide portion 20 and jaw member 34 might be provided with complemental dovetail slots and projections.

In the illustrated preferred form, a boss member 42 is provided on the base member 14, at an end opposite from the location of the anvil portion 22. The boss member 42, it will be seen, provides a reinforcing fillet between the portion of the support flange 16 and the slide portion 20. Thus, the boss member 42 provides a structural reinforcement for the base member 14. The boss member 42 includes a bore 44.

Rotatably received in the bore 44 is a rotatable member 46 for actuating the jaw member 34. The rotatable member 46 includes a threaded end portion 48, in engagement with a complementally threaded bore 50 in the jaw member 34. The rotatable member 46 also includes a nonthreaded portion 52, received in the bore 50. Collars 54 and 56, received on the rotatable member 46 on opposite sides of the boss member 42, retain the rotatable member 46 in fixed longitudinal position with respect to the base member 14. Rotation of the rotatable member 46 is effective, however, to move the jaw member 34, due to interaction of the threaded end portion 48 of the rotatable member 46 and the bore 50 of the jaw member 34.

Any convenient means may be provided to facilitate rotation of the rotatable member 46. For example, an end of the rotatable member 46 projecting beyond the boss member 42 may be provided with flats 58. A handle 60, seen in FIG. 1, may drivingly engage the flats 58. The handle 60 and rotatable member 46 provide a means for selectively moving the jaw member 34. Other equivalent means may be used, if desired.

Referring to FIGS. 1, 2 and 4, there is seen a means whereby the vise 10 may be secured to the worktable 12.

Referring to FIG. 1, the support flange 16 is seen to include blind slots 62 at spaced locations along one free edge. The worktable 12 includes spaced parallel slots 64. The spacing of the blind slots 62 corresponds to the spacing of the slots 64. The slots 64, as is apparent from FIGS. 1 and 4, comprise neck portions 66, and enlarged lower portions 68. Mounting bolts, of which the mounting bolt 70 in FIG. 4 is typical, may be received in the slots 64, to extend upwardly to engagement with the blind slots 62. The head 72 of the mounting bolt 70 is received in the enlarged lower portion of the slot 64. Threaded portion of the mounting bolt 70, designated by the reference numeral 74, extends upwardly through the neck portion 66 of the slot. A nut 76 may be applied to the threaded portion 74 of the mounting bolt 70, in a position overlying the upper surface of the support flange 16. Thus, the mounting bolt 70 and nut 76 serve to couple the vise 10 to the worktable 12. Any expedient number of mounting bolts 70 and nuts 76 may be used. Also, the support flange 16 may be provided with any convenient number of blind slots 62, corresponding to the slots 64 of the worktable 12.

The slots 64 afford the possibility of securing the vise 10 at any number of selectable locations along the worktable 12. Also, the slots 64 permit placement of the vise 10 at an edge of the worktable 12, thereby permitting the anvil portion 22 to extend outwardly over the edge of the worktable 12, as is perhaps best seen in FIG. 2. Thus, longitudinally elongated workpieces such as bars, rods or the like may be securely supported with their narrow ends positioned for cutting, drilling or the like. The worktable 12 in no way limits the longitudinal dimension of the workpiece. Thus, as is seen in FIGS. 1 and 2, a workpiece W may extend above and below the level of the surface of worktable 12.

The present invention may be embodied in other specific forms without departing from the spirit or essential attributes thereof and, accordingly, reference should be made to the appended claims, rather than to the foregoing specification as indicating the scope of the invention.

I claim:

1. A vise for supporting a generally vertically elongated workpiece, comprising a base member having a horizontally disposed support flange thereon adapted to be coupled to a horizontal support surface, a plurality of spaced slots along an edge of said flange to facilitate coupling of said flange to the support surface, said base member including a horizontally extending slide portion disposed generally at right angles to said base member to be in a vertical plane, said slide portion having an anvil at a distal end thereof, said anvil including a generally vertically disposed gripping face, a jaw member slidably coupled to said slide portion, said jaw member having a generally vertically disposed gripping face in substantially facing relation to said gripping face on said anvil, a boss member on said base member coupled to said support flange and said slide portion to provide a structural reinforcement between said horizontally disposed support flange and said slide portion, and means coupled to said jaw member and to said boss member for selectively moving said jaw member longitudinally along said slide portion, said last-mentioned means comprising a rotatable member coupled to said boss member and having a threaded end thereon, said jaw member having an internally threaded bore thereon complemental with said threaded end portion so that rotation of said rotatable member is effected to move said jaw member.

2. A vise to be carried on a support surface for holding a generally elongated workpiece in a vertical position comprising a base member including an elongated slide portion, an anvil coupled to one end of said base member, said anvil including a gripping face disposed at right angles and adjacent to said slide portion, a jaw member slidably coupled to said slide portion and having a gripping face in substantially facing relation to said anvil gripping face, means coupled to said jaw member and said base member for selectively moving said jaw member longitudinally along said slide member, and an anchorable support flange supported by said base member, said support flange extending outwardly from said base member at a substantially right angle to said elongated slide portion, said support flange extending outwardly a distance sufficient to support said base member in a vertical position, said support flange being spaced from said anvil to provide a space so that said elongated workpiece can extend transversely of said support flange with a portion of said workpiece extending below the support surface in a direction perpendicular to the support surface.

3. A vise as defined in claim 2 including means on said support flange for connecting said vise to the support surface.

4. A vise as defined in claim 3 wherein said means for connecting said support flange to the support surface is mounted on an edge of said support flange remote from said base member.

5. A vise to be carried on a support surface for holding a generally elongated workpiece in a vertical position comprising a base member including an elongated slide portion, an anvil coupled to one end of said base member, said anvil including a gripping face disposed at right angles and adjacent to said slide portion, a jaw member slidably coupled to said slide portion and having a gripping face in substantially facing relation to said anvil gripping face, means coupled to said jaw member and said base member for selectively moving said jaw member longitudinally along said slide member, an anchorable support flange supported by said base member, said support flange extending outwardly from said base member at a substantially right angle to said elongated slide portion so that when said support flange anchored to the support surface the axis of an elongated workpiece supported by said vise is substantially perpendicular to said support surface, and a plurality of slots formed along one edge of said support flange to facilitate coupling of said support flange to the support surface.